US012749368B2

(12) United States Patent
Mirjavadi et al.

(10) Patent No.: US 12,749,368 B2
(45) **Date of Patent: *Sep. 29, 2026**

(54) ELECTRONIC GAMING DEVICE HAVING EXPANDING REEL

(71) Applicant: Aristocrat Technologies, Inc., Las Vegas, NV (US)

(72) Inventors: Daniel Mirjavadi, Las Vegas, NV (US); Allon Englman, Las Vegas, NV (US); Christmas Uberuaga, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/617,172

(22) Filed: Mar. 26, 2024

(65) Prior Publication Data

US 2024/0242561 A1 Jul. 18, 2024

Related U.S. Application Data

(63) Continuation of application No. 17/710,415, filed on Mar. 31, 2022, now Pat. No. 11,972,655.

(60) Provisional application No. 63/176,096, filed on Apr. 16, 2021.

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 8,277,307 | B2 | 10/2012 | Jensen |
| 9,330,530 | B2 | 5/2016 | Englman |
| 9,542,796 | B2 | 1/2017 | Johnson |
| 9,679,434 | B2 | 6/2017 | Marks |
| 9,978,221 | B2 | 5/2018 | Friedman |
| D823,876 | S | 7/2018 | Ludwick |
| D823,877 | S | 7/2018 | Ludwick |

(Continued)

OTHER PUBLICATIONS

Dejavu Slots, Super Mega Win Fire Light Wonder 4, Mar. 25, 2018, Youtube Video, https://www.youtube.com/watch?v=7TqffQJnGqA&t=96s.*

(Continued)

*Primary Examiner* — Jason T Yen
(74) *Attorney, Agent, or Firm* — Blank Rome LLP

(57) ABSTRACT

A gaming device that incorporates an expanding mechanic on one reel of a slot-type game. The expanding reel is one example of an enhanced payout reel. Generally, although not necessarily, the expanding wild reel is a middle reel that is positioned between non-expanding slot reels. Typically, an equal number of non-expanding reels are positioned on either side of the expanding wild reel. In some embodiments, a pair of non-expanding reels may be positioned on either side of the expanding wild reel. Generally, each reel in a pair of non-expanding reels are identical. In other embodiments, multiple wild reels may be used with multiple non-expanding reels, such that the expanding reels are surrounded by, or next to, non-expanding reels.

20 Claims, 11 Drawing Sheets

(56) References Cited

U.S. PATENT DOCUMENTS

| | | | | |
|---|---|---|---|---|
| D839,305 | S | 1/2019 | Hawkins | |
| D839,899 | S | 2/2019 | Suslik | |
| D840,429 | S | 2/2019 | Kroon | |
| D842,327 | S | 3/2019 | Suslik et al. | |
| D847,189 | S | 4/2019 | Suslik | |
| D847,848 | S | 5/2019 | Suslik | |
| D849,041 | S | 5/2019 | Penacho | |
| D850,464 | S | 6/2019 | Satterlie | |
| D854,046 | S | 7/2019 | Reyes | |
| D861,716 | S | 10/2019 | Penacho | |
| D871,419 | S | 12/2019 | Hu | |
| D875,109 | S | 2/2020 | Upton | |
| D890,790 | S | 7/2020 | Marks | |
| D898,044 | S | 10/2020 | La Guardia | |
| D898,753 | S | 10/2020 | Upton | |
| D900,127 | S | 10/2020 | Visser | |
| D909,399 | S | 2/2021 | La Guardia | |
| D916,912 | S | 4/2021 | Mcglasson | |
| 11,020,664 | B2 | 6/2021 | Yang | |
| D938,446 | S | 12/2021 | Hawkins | |
| D941,844 | S | 1/2022 | Canady | |
| D942,466 | S | 2/2022 | Degens | |
| D947,226 | S | 3/2022 | Chaudhri | |
| D949,167 | S | 4/2022 | Marks | |
| D952,646 | S | 5/2022 | Ludwick | |
| D954,733 | S | 6/2022 | Masci | |
| D967,837 | S | 10/2022 | Boese | |
| 11,488,452 | B2 | 11/2022 | Kendall | |
| D973,696 | S | 12/2022 | Ludwick | |
| D974,386 | S | 1/2023 | Pryor | |
| D978,896 | S | 2/2023 | Hartstein | |
| D978,898 | S | 2/2023 | Hartstein | |
| D983,806 | S | 4/2023 | Mirjavadi | |
| D987,665 | S | 5/2023 | Penacho | |
| D987,669 | S | 5/2023 | Hoenig | |
| 2005/0130737 | A1 | 6/2005 | Englman | |
| 2009/0131154 | A1 | 5/2009 | Chim | |
| 2010/0016061 | A1* | 1/2010 | Gomez | G07F 17/3267 463/20 |
| 2013/0102375 | A1* | 4/2013 | Aoki | G07F 17/3213 463/20 |
| 2014/0051494 | A1* | 2/2014 | Marks | G07F 17/3265 463/20 |
| 2016/0133094 | A1 | 5/2016 | Thomas | |
| 2016/0314661 | A1* | 10/2016 | Vann | G07F 17/3288 |
| 2018/0033253 | A1 | 2/2018 | Vann | |
| 2020/0051373 | A1 | 2/2020 | Meyer | |
| 2020/0330853 | A1 | 10/2020 | Navio | |
| 2021/0065500 | A1 | 3/2021 | Boese | |

OTHER PUBLICATIONS

Fire Light Wonder 4 (Year: 2018).*

YouTube, "Fire Light—Twin Spins Feature", https://www.youtube.com/watch?v=T6YWU58r0ng&feature=share, Jul. 24, 2014, 1 page.

Notice of Allowance dated Feb. 16, 2023 for U.S. Appl. No. 29/809,949 (pp. 1-10).

YouTube, "Super Mega Win ? Fire Light Wonder 4 Insane Retrigger Max Bet Bonus", https://www.youtube.com/watch?v=7TqffQJnGqA&t=96s, Mar. 25, 2018, 1 page. (Year: 2018).

Office Action (Non-Final Rejection) dated Jun. 1, 2023 for U.S. Appl. No. 17/710,415 (pp. 1-25).

Notice of Allowance dated Jun. 16, 2023 for U.S. Appl. No. 29/887,478 (pp. 1-9).

Kim Jennings, published Mar. 4, 2014 [online] by YouTube.com. Site accessed May 24, 2023. Available at URL: <https://www.youtube.com/watch?v=qd0cyiSane0>.

Slot Slasher, published Apr. 13, 2013 [online] by YouTube.com. Site accessed May 24, 2023. Available at URL: <https://www.youtube.com/watch?v=9nAM3cmCNRw>.

The Slot Ant, published May 21, 2023 [online] by YouTube.com. Site accessed May 24, 2023. Available at URL: <https://www.youtube.com/watch?v=uVsN0K3elTw>.

Notice of Allowance dated Oct. 5, 2023 for U.S. Appl. No. 29/887,478 (pp. 1-6).

Office Action (Final Rejection) dated Oct. 23, 2023 for U.S. Appl. No. 17/710,415 (pp. 1-26).

Office Action (Notice of Allowance and Fees Due (PTOL-85)) dated Mar. 4, 2024 for U.S. Appl. No. 17/710,415 (pp. 1-5).

* cited by examiner

ELECTRONIC GAMING DEVICE HAVING EXPANDING REEL

CROSS-REFERENCE TO RELATED APPLICATIONS

This application is a continuation of U.S. patent application Ser. No. 17/710,415, filed Mar. 31, 2022, which is a nonprovisional and claims the benefit under 35 U.S.C. 119(e) of U.S. Provisional Patent Application No. 63/176,096, filed Apr. 16, 2021, the contents of which are incorporated herein by reference as if fully disclosed herein.

FIELD

The described embodiments relate generally to gaming devices and, more particularly, to gaming devices configured to control a return to player and volatility through the use of an expanding reel that replaces one or more symbols on a reel with an expanded symbol, thereby increasing odds of a match and payout to a player.

BACKGROUND

Electronic gaming machines ("EGMs") or other gaming devices provide a variety of wagering games such as slot games, video poker games, video blackjack games, roulette games, video bingo games, keno games and other types of games that are frequently offered at casinos and other locations. Play on gaming devices typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the gaming device and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or pay lines) through the matrix indicate the outcome of the game; some games may utilize an "all ways pay" payout scheme. The display typically highlights winning combinations/outcomes for identification by the player. Matching combinations and their corresponding awards are usually shown in a pay table which is available to the player for reference. Often, the player may vary his/her wager to include differing numbers of pay lines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments described herein may take the form of an electronic gaming device that incorporates an expanding wild mechanic on one reel of a slot-type game. The expanding reel is one example of an enhanced payout reel; one example of an expanding reel is an expanding wild reel. In operation, a player may play the game by initiating a spin of the reels. Generally, the reels stop such that multiple symbols on each reel are visible on the playing field; each symbol occupies a separate position on the playing field. The expanding reel has a number of wild symbols which may match any symbol on any other reel when payouts are determined. If a wild symbol is displayed on the playing field then it expands or "grows" to occupy all positions along its column (e.g., it expands to fill all positions on the corresponding column of the playing field), as may other special symbols in other embodiments. By expanding to fill all positions in the column, a single wild (or other special symbol) may effectively match multiple rows of symbols. Generally, as the wild symbol expands, it replaces other symbols shown on the playing field in that column.

Other embodiments may use expending reels that cause another special symbol, or symbols, to expand in this manner when the symbol(s) appears on the playing field as part of the expanding reel. For example, a multiplier symbol, jackpot symbol, bonus game award symbol, or other such special symbol may expand and match adjacent symbols as described herein.

Certain embodiments described herein may take the form of a gaming device, comprising: a housing; a wagering input for accepting a wager from a player, the wager representing an initial credit balance of the player with the gaming device; a processor within the display and operative to: determine, through a first call to a random number generator, a first set of symbols chosen from a first reel; determine, through a second call to the random number generator, a second set of symbols chosen from an expanding reel; determine, through a third call to the random number generator, a third set of symbols chosen from a third reel; and a display attached to the housing and operative to: display the first set of symbols in a first and second column of a playing field; display the second set of symbols in a third column of the playing field; and display the third set of symbols in a fourth and fifth column of the playing field; wherein the processor is further operative to: determine if any of the third set of symbols is a special symbol; in the event any of the third set of symbols is a special symbol, replace all symbols displayed in the third column with an expanded special symbol; wherein the expanded special symbol replaces at least one high-value picture symbol.

Other embodiments described herein may take the form of method for operating a slot type wagering game, comprising: determining, by a processor calling a random number generator function a first time, a first set of symbols chosen from a first non-expanding reel; determining, by the processor calling the random number generator function a second time, a second set of symbols chosen from an expanding reel; determining, by the processor calling the random number generator a third time, a third set of symbols chosen from a second non-expanding reel; determining, by the processor, if any of the second set of symbols is a wild symbol; in the event the processor determines any of the second set of symbols is a wild symbol, expanding the wild symbol to occupy all positions of the third column, thereby removing at least one high-paying symbol from the third column; determining if a combination of the first set of symbols, second set of symbols, and third set of symbols corresponds to a payout; displaying, on a display of an electronic gaming device, the first set of symbols in a first column and a second column of a playing field; displaying, on the display of the electronic gaming device, the second set of symbols in a third column of the playing field; displaying, on the display of the electronic gaming device, the third set of symbols in a fourth column and a fifth column of the playing field.

Still other embodiments described herein may take the form of a computer-readable medium containing instructions which, when executed by one or more processors of one or more servers, cause the one or more processors to: initiate a playing field on a gaming device, by using a random number generator or a lookup table to assign a set of reels to the playing field; randomly determine, using a random number generator or a lookup table, when the set of reels is to be stopped, thereby determining a set of symbols to be shown on the playing field; determine whether a wild symbol is shown on the playing field; in the event the wild symbol is shown on the playing field, replacing at least one high-value symbol in a column containing the wild symbol with an expanded wild symbol; wherein: the playing field is formed from multiple columns; at least one of the set of reels is an expanding reel; the expanding reel comprises: the wild symbol; and the at least one high-value symbol adjacent the wild symbol; the expanding reel is assigned to a central column of the playing field; a first reel of the set of reels is assigned to a first pair of columns; a second reel of the set of reels is assigned to a second pair of columns; the first pair of columns is on a first side of the central column on the playing field; and the second pair of columns is on a second side of the central column on the playing field.

DETAILED DESCRIPTION

Figure 1:
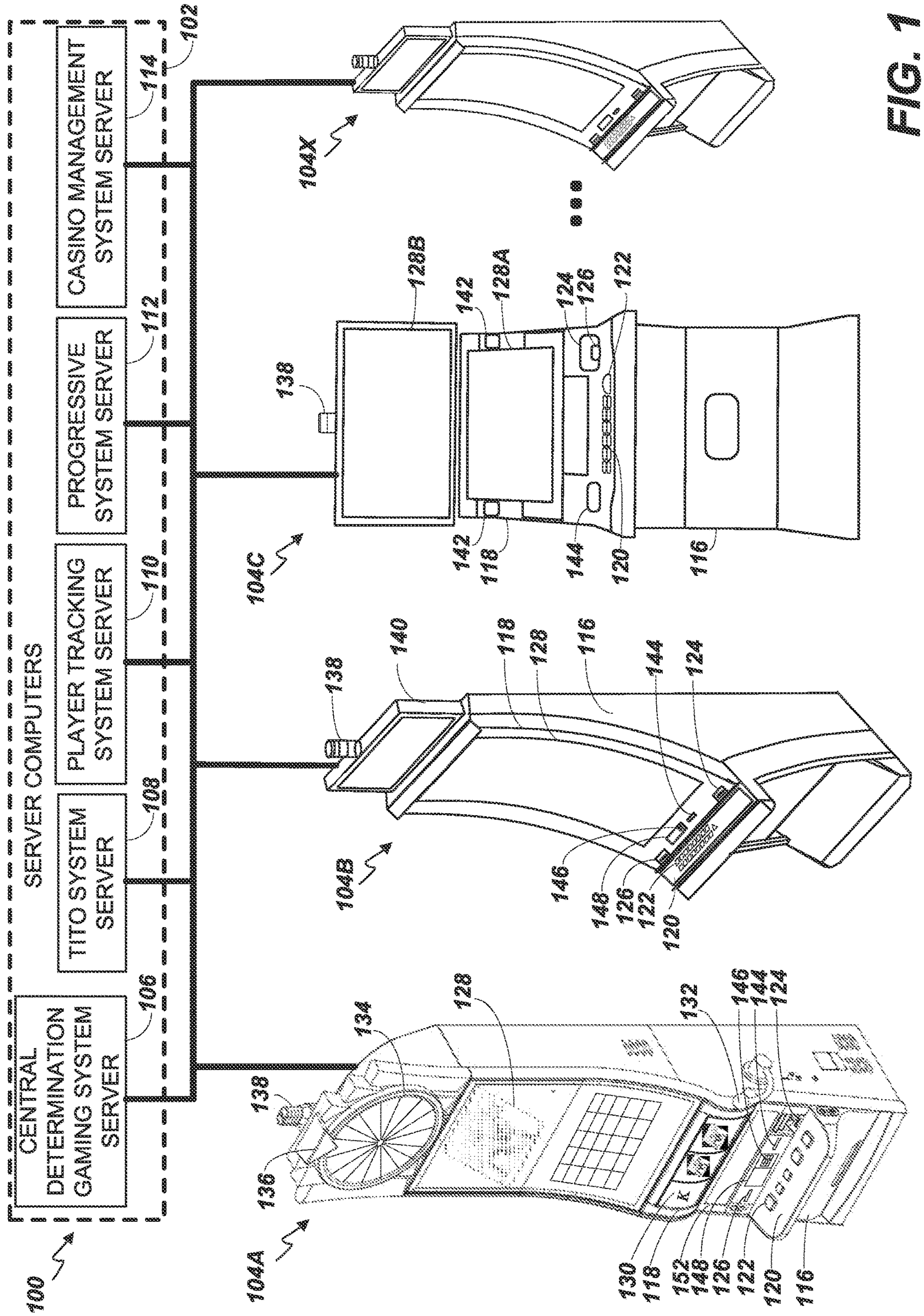
FIG. 1 is an exemplary diagram showing several gaming devices networked with various gaming related servers.

Embodiments described herein may take the form of a gaming device that incorporates an expanding mechanic on one reel of a slot-type game. The expanding reel is one example of an enhanced payout reel. Generally, although not necessarily, the expanding wild reel is a middle reel that is positioned between non-expanding slot reels. Typically, an equal number of non-expanding reels are positioned on either side of the expanding wild reel. In some embodiments, two non-expanding reels may be positioned on either side of the expanding wild reel. In other embodiments, multiple wild reels may be used with multiple non-expanding reels, such that the expanding reels are surrounded by, or next to, non-expanding reels.

As used herein, a "non-expanding reel" is a reel for a slot type game that has a pattern formed from different types of symbols, including blank symbols, arranged along a length of the reel. As the game is played, the reel spins, presenting each symbol sequentially in a playing field. The reel may be mechanical or electronic. Mechanical reels generally are physical strips with their opposing ends attached to one another to form a circle. Electronic reels are virtual implementations of such a mechanical reel; an electronic reel spins virtually as described in more detail herein. An expanding reel may be used in a slot-type game employing either mechanical or electronic reels, or a combination of both.

Typical existing slot-type games utilize pay lines to determine a user's payout (if any). These pay lines are generally static and set for every game played on the gaming device, whether a single pay line or 40 pay lines are used. Some games may be an "all ways pay" game in which all rows provide a payout if a suitable number of symbols match on that row. Some "all ways pay" games may pay matching symbols on adjacent rows in addition to paying such matches on a single row (e.g., diagonal matches are allowed). These games use a relatively simple way to control RTP and volatility of a game played on a gaming device insofar as the only random element is the motion of the reels, and particularly what symbols are shown when the reels stop. A probability table (such as a weighted lookup table) or probability function may be used to determine where each reel stops and thus what symbols are shown on a playing field. In this way a gaming device operator or manufacturer can set both the probability of a payout (e.g., RTP) and a volatility of a game.

By contrast, games using an expanding reel introduce an additional element of randomness to a slot-type game. In such games, the RTP and volatility are directly affected by the expansion of a symbol, such as a wild symbol, as this increases a probability of payout by increasing a likelihood of a match along multiple rows (or, in some embodiments, columns). Further, as the expanding reel expands, it replaces adjacent symbols on its row which likewise alters a payout. Both RTP and volatility of a game incorporating an expanding reel may be constrained through construction of the expanding reel, namely by controlling what symbols are placed near or next to expanding symbols and a density of expanding symbols on the reel. RTP and volatility may be further constrained by placing an expanding reel in a particular column of a playing field relative to other non-expanding reels. For example, non-expanding reels having fewer potentially matching symbols, or lower-value symbols, may be placed next to the expanding reel to lower payout values.

With respect to embodiments described herein, a player may play a game on a gaming device by initiating a spin of the reels. Generally, the reels stop such that multiple symbols on each reel are visible on the playing field; each symbol occupies a separate position on the playing field. "Positions" are unique elements in an array defined by rows and columns, where each reel is in (or defines) a single column and each set linearly aligned set of symbols, from left to right, is in a single row. A "row" thus includes one symbol from each of the reels. Likewise, each reel displays symbols in a single column of the playing field.

The expanding reel has a number of special symbols (here, wild symbols) which may match any symbol on any other reel when payouts are determined. If a wild symbol is displayed on the playing field then it expands or "grows" to occupy all positions along its column (e.g., it expands to fill all positions on the expanding wild reel). By expanding to fill all positions in the column, a single wild may effectively match multiple rows of symbols. Generally, as the wild symbol expands, it replaces other symbols shown on the playing field in that column. The act of expanding the wild symbol can greatly enhance RTP in comparison to conventional slot games insofar as the expanded wild symbol may create more matches, and likewise may remove low-value symbols that would otherwise remain on the playing field. It should be appreciated that some embodiments utilize an expanding reel for which a symbol other than a wild symbol may expand. Non-limiting examples include an expanding reel where a payout symbol, multiplier symbol, bonus game award symbol, or other special symbol expands when it is shown on the playing field. Thus, references to a wild symbol expanding or matching other symbols are understood to encompass special symbols in general.

This impacts the return to player ("RTP") and volatility of the game. In most jurisdictions, both RTP and volatility are strictly regulated. Further, a game manufacturer may wish to control and/or bound either or both of RTP and volatility to ensure they, across time, fall within a certain range. For example, a manufacturer and/or operator may wish to have a gaming device's payout percentage (that is, the RTP) be 95-98% of totals wagered by players, across a certain time. High volatility may cause undesirable fluctuations in RTP.

Embodiments described herein may constrain volatility and RTP through configuration of the expanding reel, and particularly through placement (whether physical or virtual) of certain symbols with respect to one another, and particularly with respect to wild symbols. High value picture symbols may be placed on either side of a series of wild symbols on the reel strip. Thus, if a wild symbol appears in the playing field, it expands to either take the place of other wild symbols or these high value symbols. By replacing high value symbols rather than low value symbols, or even blank symbols, the RTP and volatility of the gaming device are reduced. In some embodiments, reels may extend across rows rather than columns and the wild symbol may expand across a row while matches are made along columns. In yet other embodiments, each position on a playing field may have its own reel. In these embodiments, RTP and/or volatility are likewise constrained as discussed. This, in turn, provides unique functionality not heretofore seen in any gaming device and likewise unique modes of operation directly impacting the operation and functionality of the gaming device.

Additionally, many embodiments described herein control volatility and/or RTP by positioning an expanding reel between matching pairs of non-expanding reels. For example, with respect to a gaming device having five columns constituting a playing field, the expanding reel may be shown on the central column (e.g., third reel when counting from left to right) between the two leftmost columns (e.g., columns one and two, counting left to right) and the two rightmost columns (e.g., columns four and five, counting left to right). Typically, pairs of columns have the same reel or matching reels assigned to them. For example, columns one and two may be assigned the same reel or matching reels as may columns four and five. Further, the reel or reels in any pair of columns stops in such a way as to ensure that identical symbols are displayed in identical positions of the playing field. This ensures that a player always matches at least two symbols in each row and may match three symbols if the expanding reel shows the same symbol, in the same row, as an adjacent pair of columns or displays a wild symbol, including an expanded wild symbol. Five of a kind matches may occur when the leftmost pair of columns displays the same symbol, in the same row, as the rightmost pair of columns and the central column shows either a matching symbol or a wild symbol, including expanded symbols.

By placing the expanding reel between pairs of matching columns, RTP and volatility of a game played on a gaming device may be controlled. Volatility is generally lowered as matches are made more often and so a player is paid more often. To counter this, the payout for any given match may be less than a payout for a match having the same likelihood of occurring in a game that uses neither an expanding reel nor matching pairs of columns.

FIG. 1 illustrates several different models of gaming devices which may be networked to various gaming related servers. Shown is a system 100 in a gaming environment including one or more server computers 102 (e.g., slot servers of a casino) that are in communication, via a communications network, with one or more gaming devices 104A-104X (electronic gaming devices such as, slot machines, video poker machines, bingo machines, etc.) that can implement one or more aspects of the present disclosure. The gaming devices 104A-104X may alternatively be portable and/or remote gaming devices such as, but not limited to, a smart phone, a tablet, a laptop computing device, a desktop computing device, or a game console, and/or any suitable software (including applications and web pages accessible through a web browser) operating thereon. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (Wi-Fi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple gaming devices connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Realm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
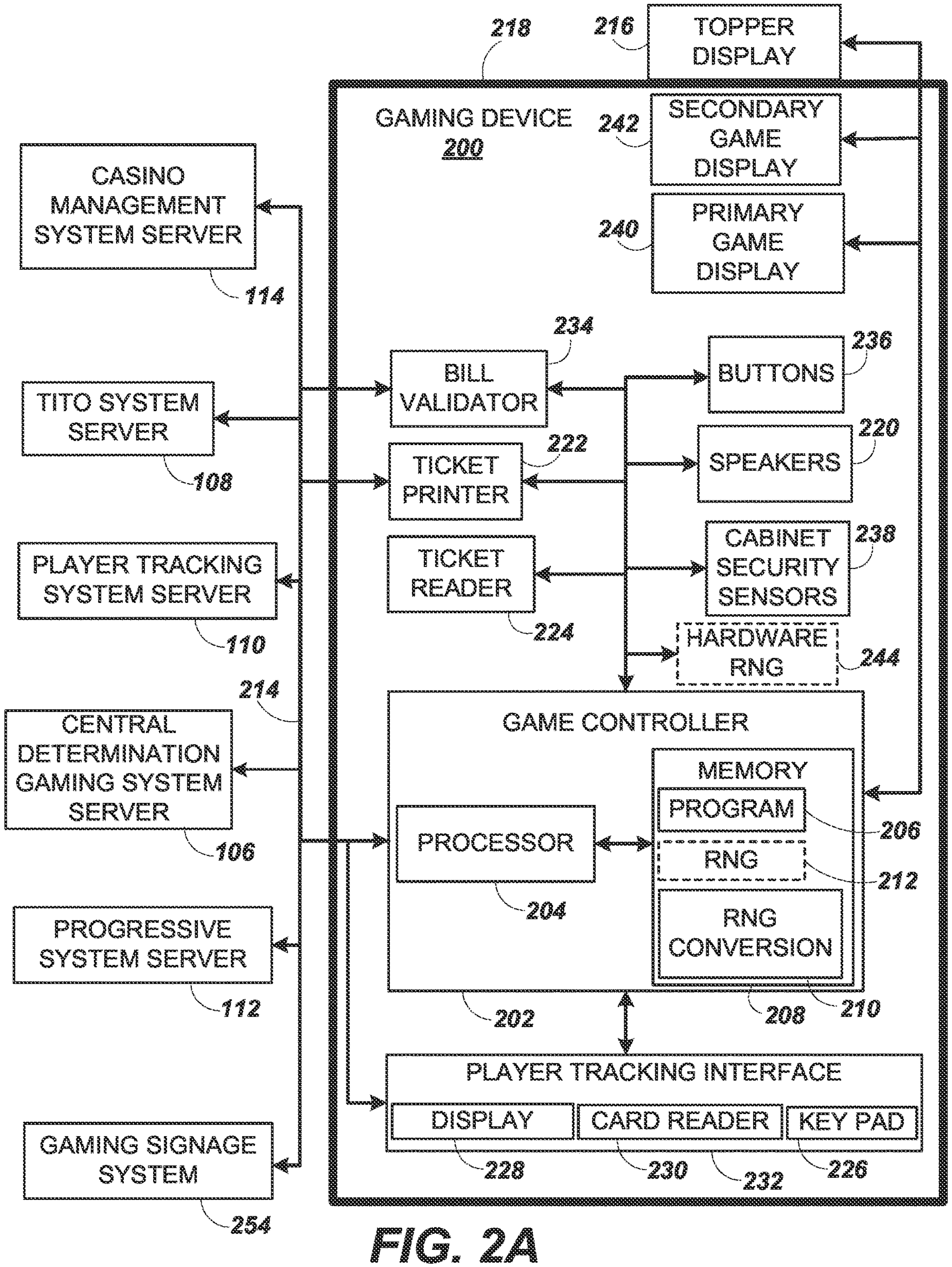
FIG. 2A is a block diagram showing various functional elements of an exemplary gaming device.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random-access memory (DRAM), magnetic random-access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI))

to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of a gaming device. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 or processor 204 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 (a "wagering input") to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game displays 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., Wi-Fi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
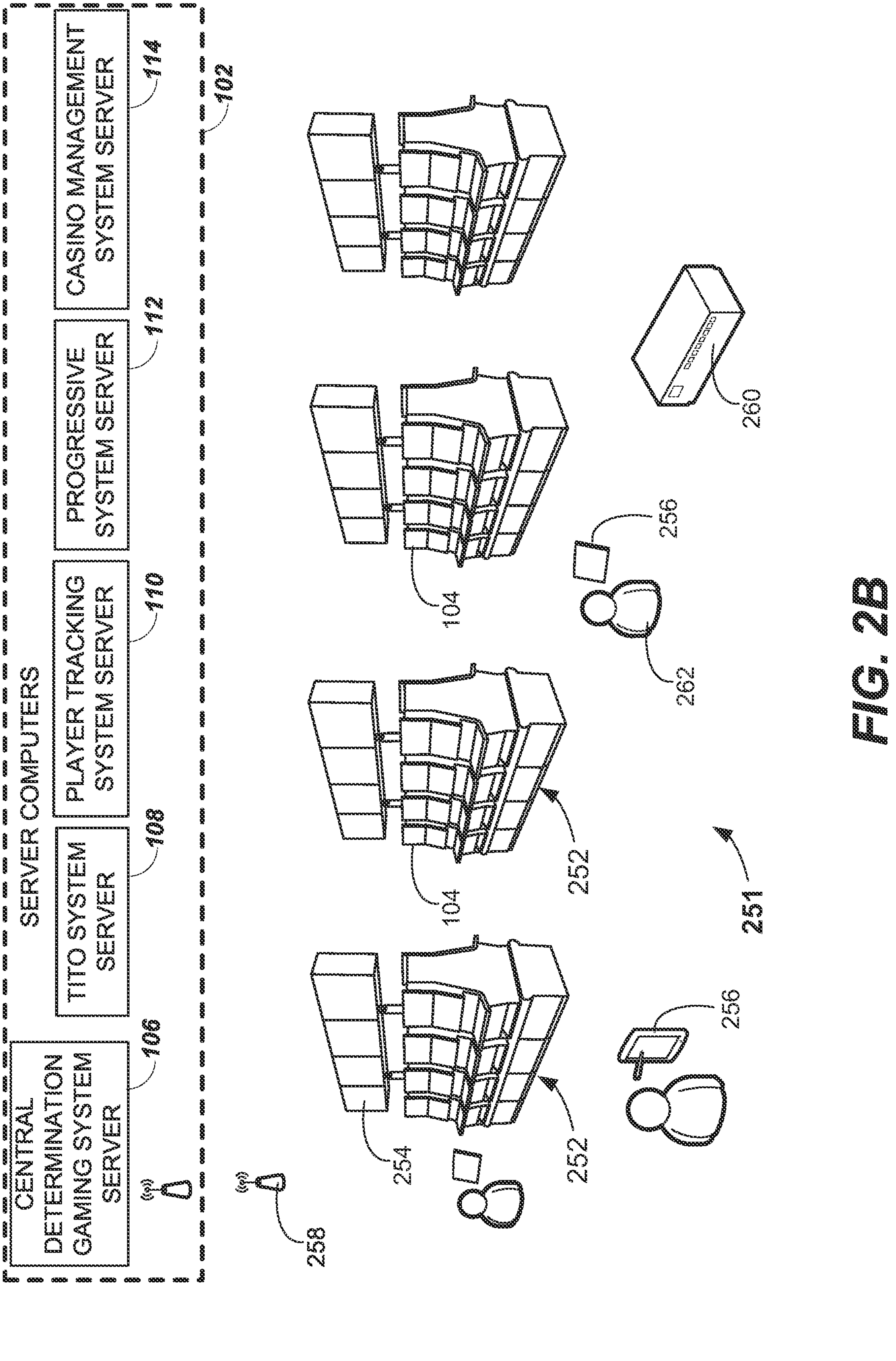
FIG. 2B depicts a casino gaming environment according to one example.

FIG. 2B depicts a casino gaming environment according to one example. In this example, the casino 251 includes banks 252 of gaming devices 104. In this example, each bank 252 of gaming devices 104 includes a corresponding gaming signage system 254 (also shown in FIG. 2A). According to this implementation, the casino 251 also includes mobile gaming devices 256, which are also configured to present wagering games in this example. The mobile gaming devices 256 may for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the gaming devices 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
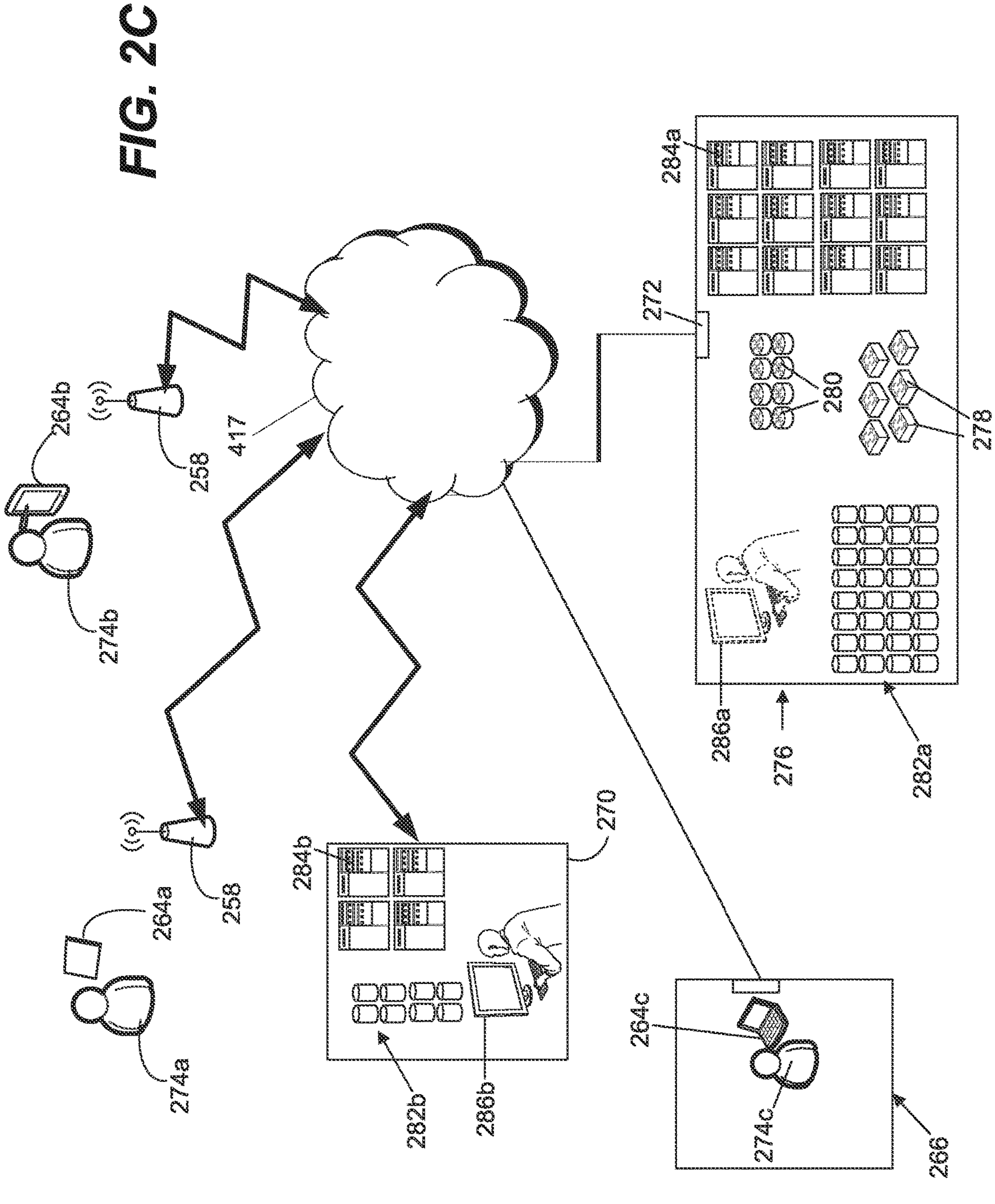
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may for example, be capable of applying data filtering algorithms, executing data summary and/or analysis software, etc. In some implementations, data filtering, summary and/or analysis software may be available as "apps" and downloadable by authorized users.

Figure 3:
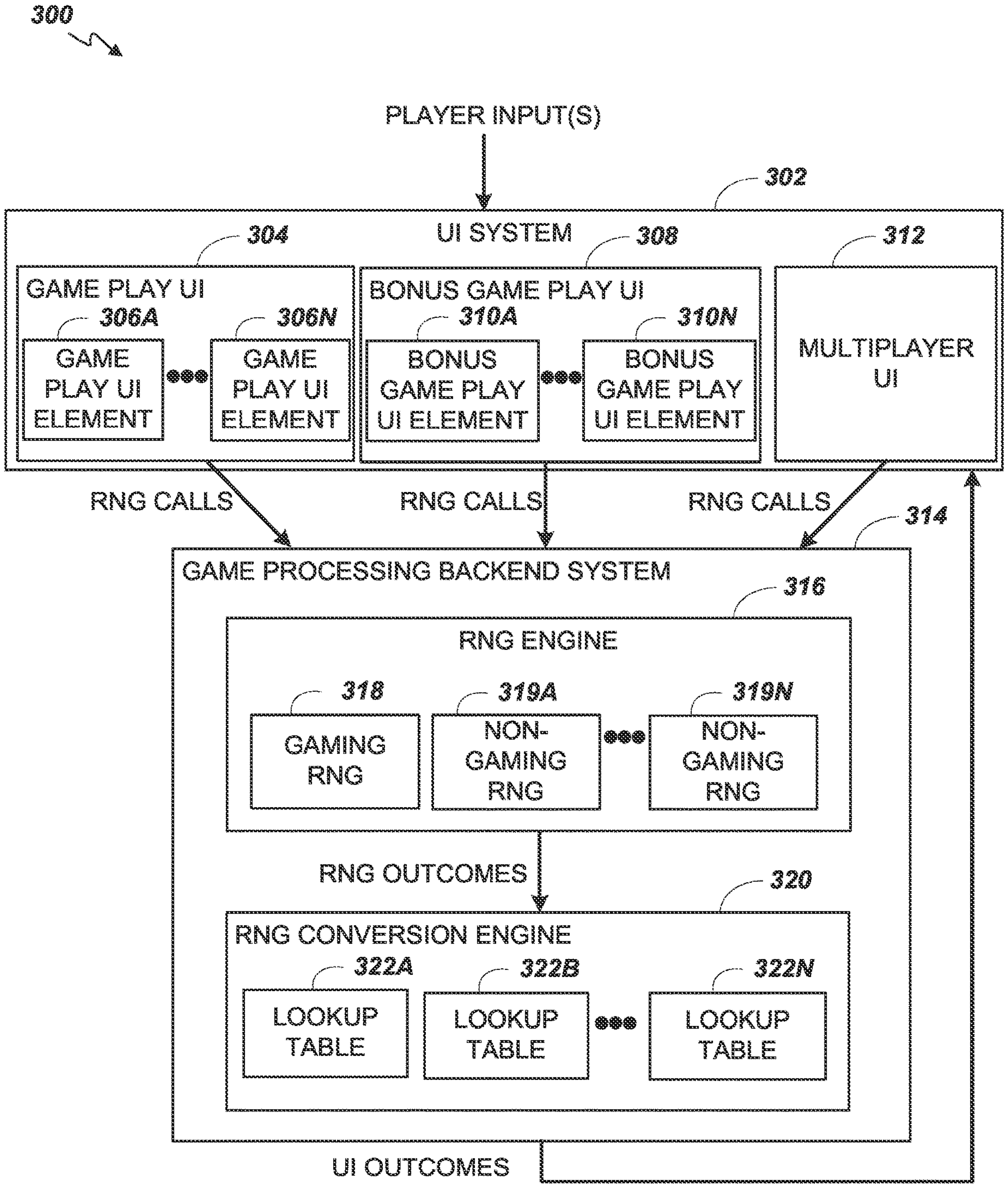
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes, such as which symbols are shown on a playing field (or otherwise on a display) as selected from a set of reels. Any column or group of matching columns, as described herein, may be assigned a reel selected from a set of reels. This is true of the expanding reel as well; there may be multiple different expanding reels for use with the central column, or other column to which an expanding reel is assigned, and a single such expanding reel may be assigned from the set to the column. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N. In certain embodiments described herein, the bonus game UI may include an expanding reel while a base game may not.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
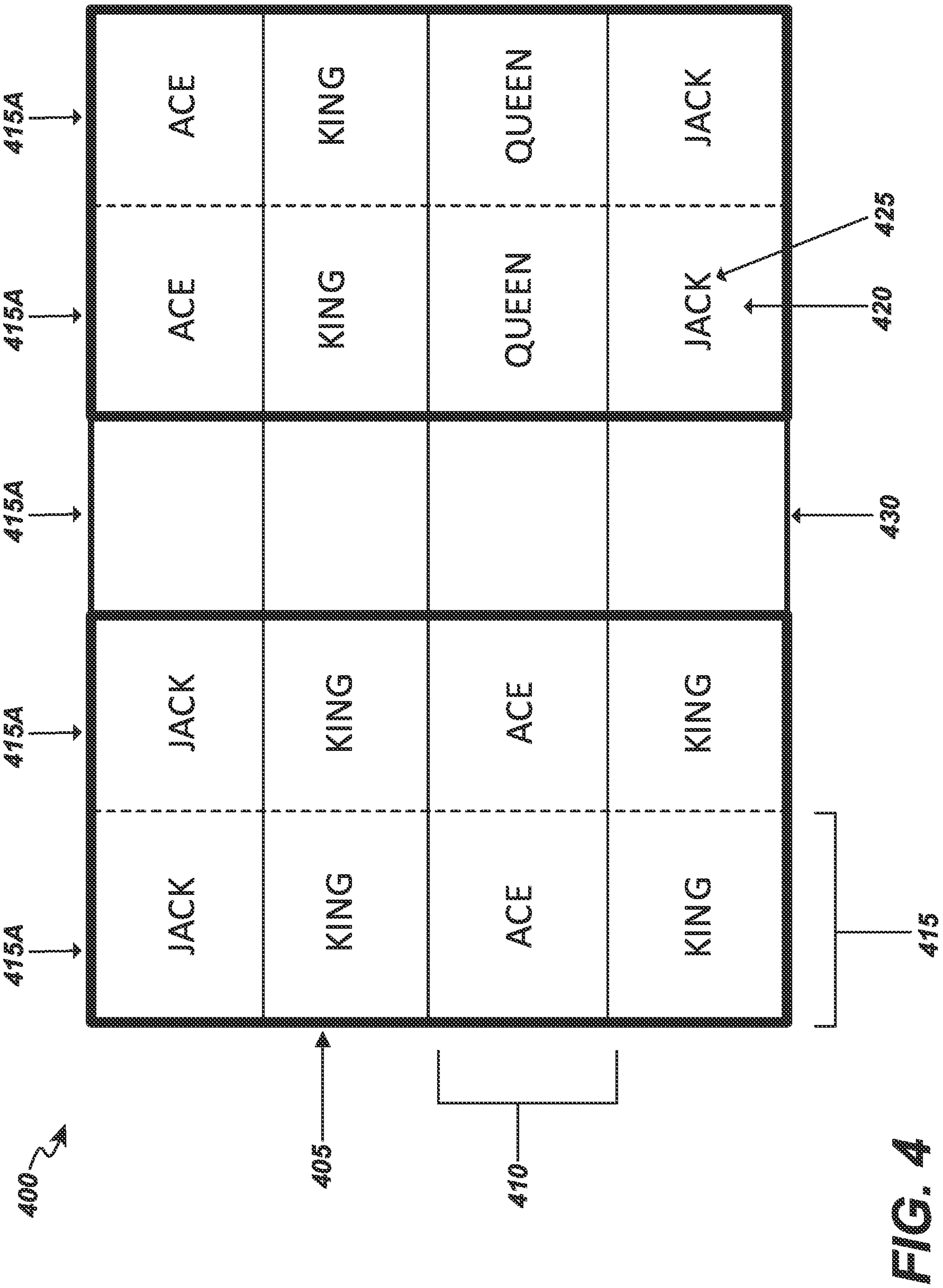
FIG. 4 illustrates an example playing field incorporating an expanding reel, as shown on a display of a gaming device.

Sample gaming devices, such as those described with respect to FIGS. 1-3, may operate or incorporate a slot-type game in response to a player input and/or wager. The slot-type game 400 includes multiple reels, each of which displays at least one column of symbols in a playing field when the game is initiated (e.g., the reels are "spun"). In one sample embodiment as shown in FIG. 4, the playing field 405 may be a five by four array of rows 410 and columns 415, defining 20 unique positions 420 in which symbols 425 are displayed. Each column 415 corresponds to a unique reel. In the embodiment 400 shown in this figure, the central column 415C is an expanding wild column. Likewise, in this embodiment 400 the first and second columns 415A, 415B depict symbols 425 that are generated by two identical reels or the same reel, such that the first and second columns 415A, 415B always display the same symbols as one another. The fourth and fifth columns 415D, 415E likewise show symbols generated by spinning identical reels (or the same reel) and the symbols shown in the fourth and fifth columns are always identical.

The first and second columns 415A, 415B may use a single RNG call to determine which symbols are shown in the playing field 405 by both reels. Since the first and second reels are identical, they therefore "spin" identically and stop identically, thus showing the same symbols in the same order in their respective columns 415A, 415B. Accordingly, the symbols 425 in the first and second columns 415A, 415B will always match.

The fourth and fifth reels, corresponding to the fourth and fifth columns 415D, 415E, likewise are identical and their end states are determined by a single RNG function, such that the symbols that are shown in the fourth and fifth columns of the playing field when the reels stop are also identical. As with the first and second reels, this ensures that each symbol on the fourth column matches the symbol shown in the fifth column, on the same row.

In some embodiments, matching two symbols on a row (e.g., a two-symbol match) generates a payout to a player, while in others it may not. In embodiments 400 that pay out a two-symbol match, the return for three such matches is generally less than a wager amount. Given that all symbols shown on the first column of the playing field necessarily match all symbols shown on the second column of the playing field, there are always a minimum of three two-symbol matches in any play of the game. By ensuring that three two-symbol matches do not pay more than the wager, RTP is not inherently greater than 100%. It should be appreciated that there may be as many as six two-symbol matches in a single play; the first and second column 145A, 145B symbols may all match and the fourth and fifth column 145D, 145E symbols may all match.

It should be appreciated that each set of matching reels/columns (e.g., first and second, fourth and fifth) may be separate but identical reels whose symbols 425 always match along each row 410, or a single double-width reel may be used to show symbols in two columns of the playing field 405. By ensuring the columns on either side of the expanding reel are matching columns, or sets of matching columns, volatility and RTP of the game may be controlled.

Figure 7:
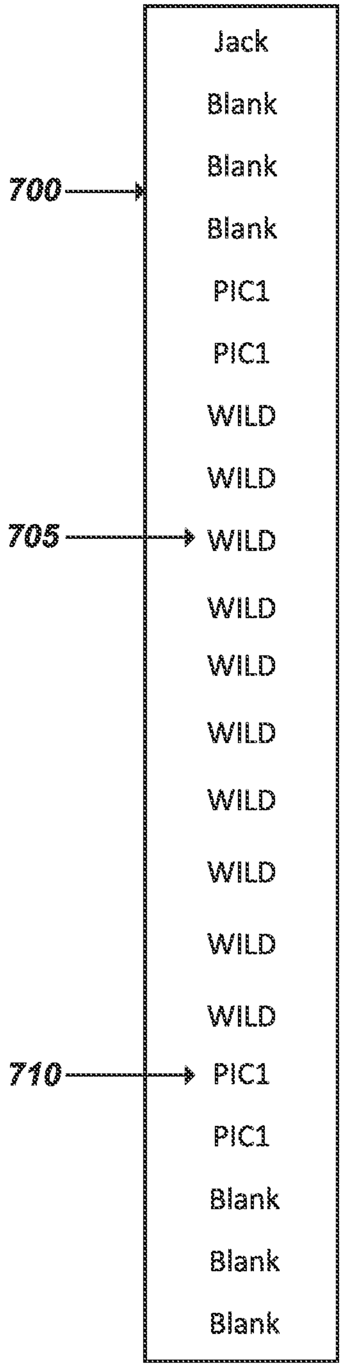
FIG. 7 illustrates a sample construction of an expanding reel.

In the embodiment shown in FIG. 4, symbols 425 displayed in positions 420 of the center column 415C are determined from an expanding reel 430. As with other reels described herein, the expanding reel 430 is constructed, either physically or electronically, from a set pattern of symbols. The expanding reel 430 may include wild symbols, picture symbols, and/or blank symbols. Generally, multiple wild symbols are positioned adjacent to one another with high value picture symbols at either end of the series of wild symbols (or other expanding symbol, in other embodiments). An example of a wild reel and symbol placement thereon is shown in FIG. 7 and discussed in more detail with respect to that figure.

Figure 5:
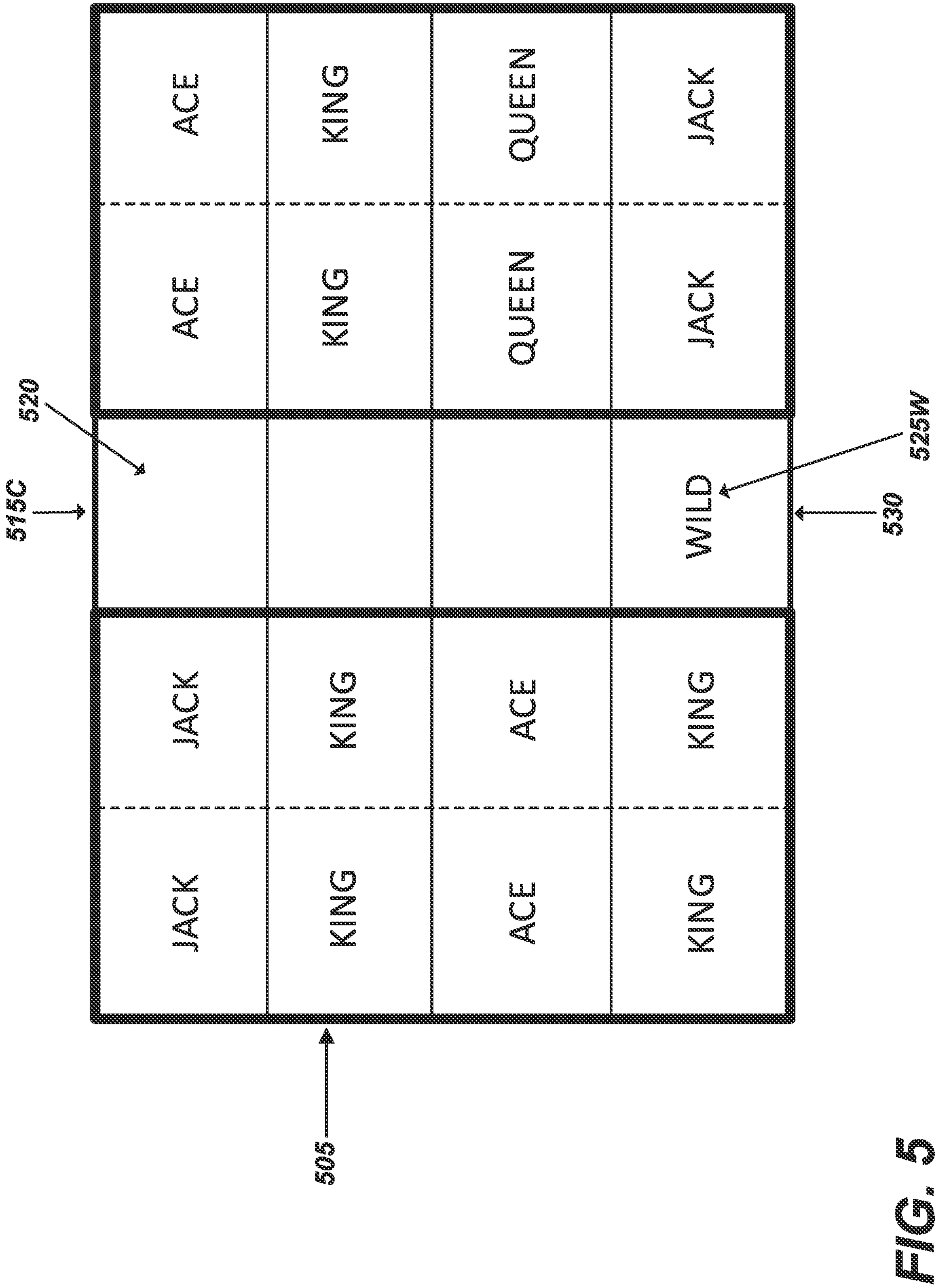
FIG. 5 illustrates the example playing field of FIG. 4 with a wild symbol shown.

Operationally, during game play the expanding reel 430 spins like other reels, stopping to display some combination of blank symbols, picture symbols, and wild symbols. If any wild symbol appears in any position of the center column 415C, it expands to fill all other positions of the column. FIG. 5, for example, shows a playing field 505 with at least one wild symbol 525W in a bottom position 420 of the center column 515C. The other positions of the center column 515C depict picture symbols, which ordinarily may match symbols on the same row in adjacent columns of the playing field 505. Some embodiments may not use an expanding reel but instead may utilize a reel having a large number of wild symbols adjacent to one another, such that the wild symbols achieve a high density relative to other symbols on the reel.

As the portion of the expanding reel 530 shown on the playing field shows a wild symbol 525W, the processor of the gaming device executes one or more operations to expand the wild symbol from its initial position 525W to occupy the entirety of the center column 515C, thereby matching all symbols on either side of the center column 515C. This is shown, for example, in FIG. 6A where the wild symbol 525W has expanded to fill all positions 520 of the center column. When the wild symbol expands or otherwise comes to occupy all positions on the center column 515C, the symbols in each row can be either three of a kind matches (with the expanded wild symbol) or five of a kind matches (with the expanded wild symbol); two of a kind or four of a kind matches are no longer possible.

A three of a kind match occurs when, for any given row, the picture symbol shown in the first and second columns is different than the picture symbol shown in the fourth and fifth columns. The wild symbol thus provides two separate three of a kind matches for the given row. This is shown, for example, in the first row of the playing field shown in FIG. 6A. If, again for any given row, the picture symbols in the first and second columns are the same as the picture symbols in the fourth and fifth columns, then the processor of the gaming device registers a five of a kind match for that row. This is shown in the second row of the playing field in FIG. 6A. Should any row include a blank symbol at any position then the wild symbol does not provide a payout for the portion of the row in which the blank symbol is positioned. It should be noted that some embodiments may not use blank symbols in any reel other than an expanding reel while other embodiments may.

Additionally, certain gaming devices may match picture symbols on the first and second columns with the same symbols shown on the fourth and fifth columns even if they are in different rows, so long as an expanded wild symbol is shown in the center column. This functionality may vary from gaming device to gaming device, or even within a single gaming device operating under different parameters. For example, non-row matching of symbols may occur in free or bonus games but not in a base game, or vice versa. It may occur in certain types of games but not in others. It may occur in response to a wager exceeding a threshold, and so on. Any of the functionality described herein, including the expanding reel, may operate in certain games or conditions but not in others, including during bonus games but not normal games.

Figure 6A:
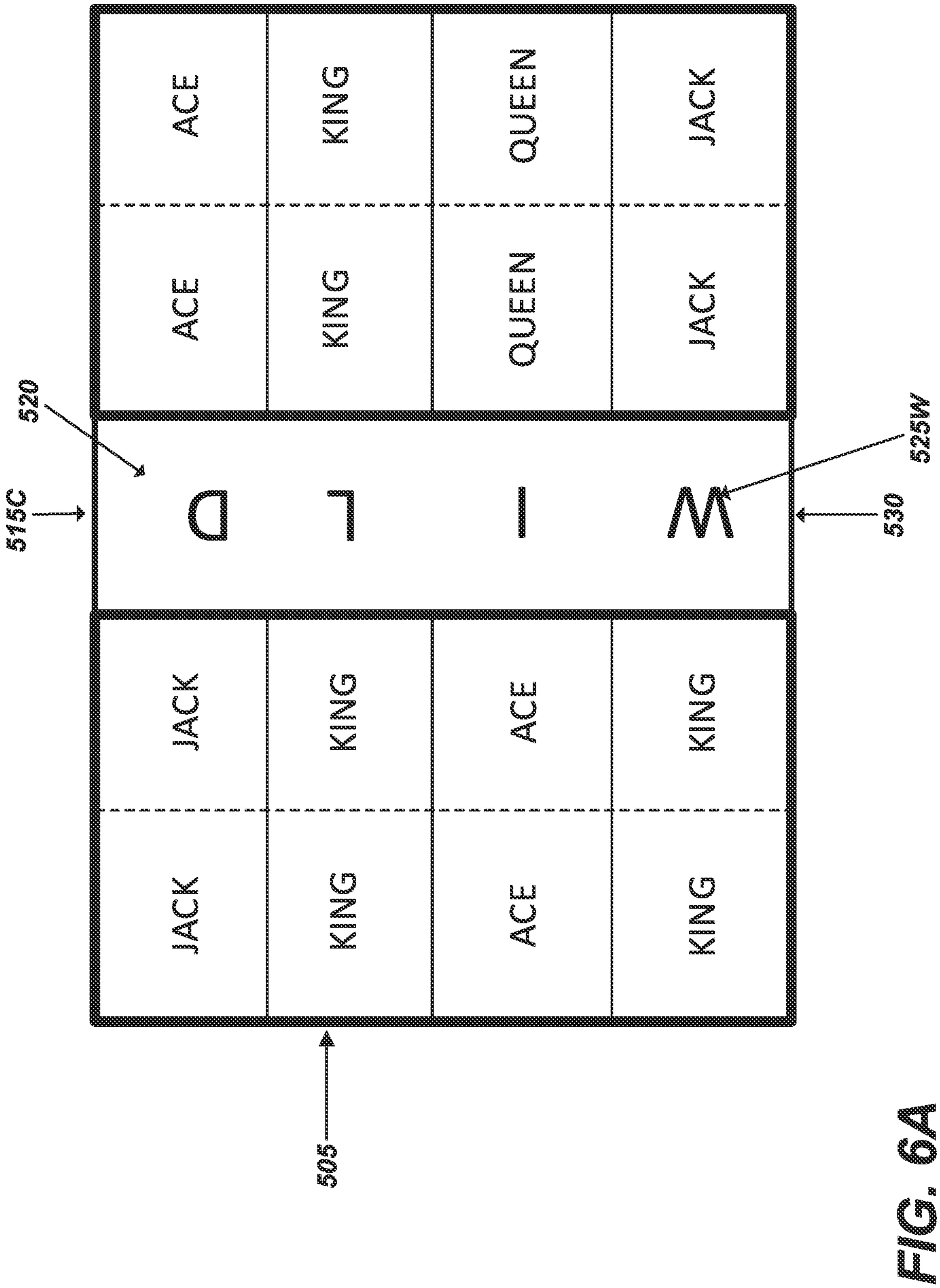
FIG. 6A illustrates the example playing field of FIGS. 4 and 5 with the wild symbol expanded to occupy all positions of its corresponding column.
Figure 6B:
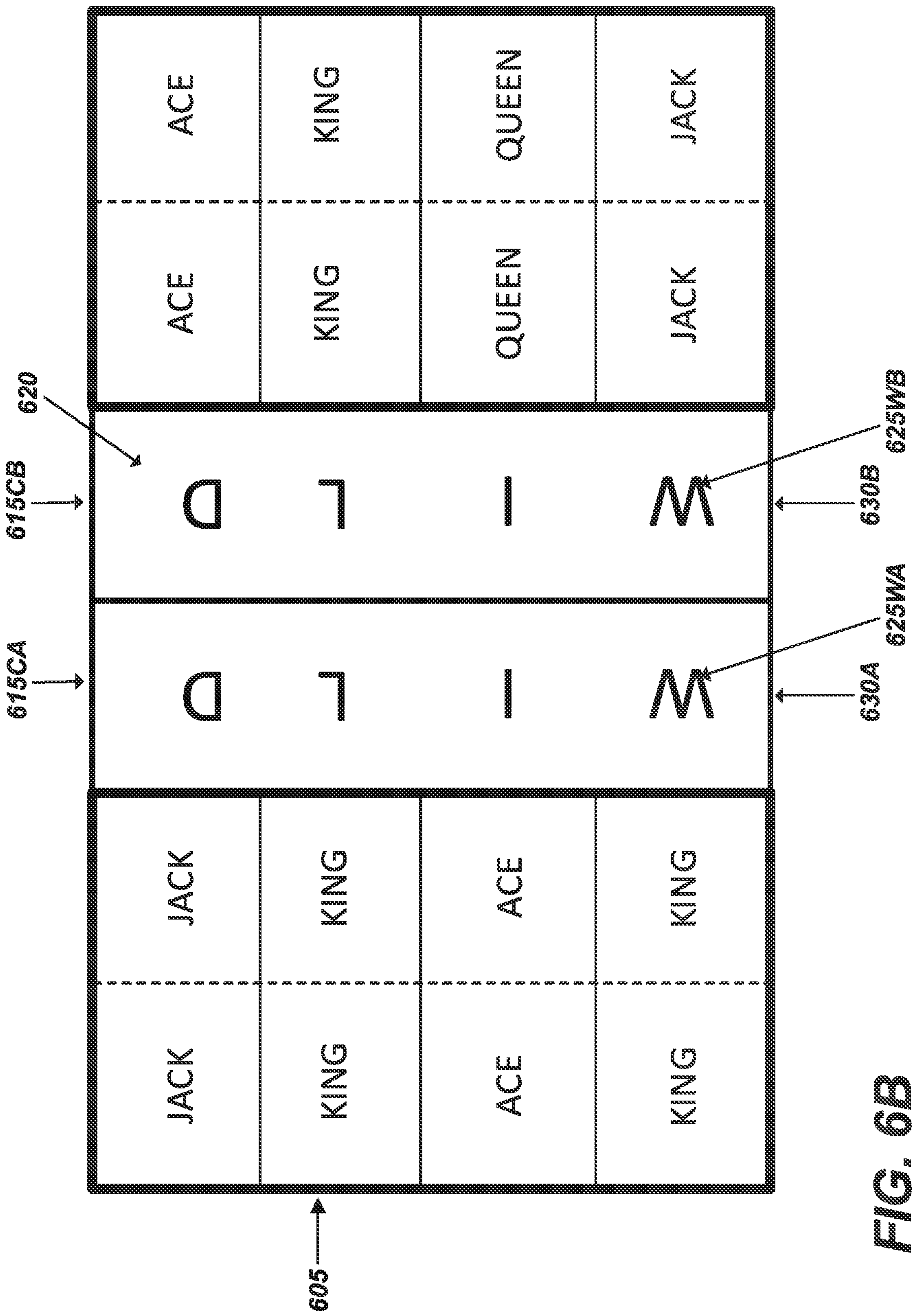
FIG. 6B illustrates the example playing field of FIGS. 4 and 5 with an expanded wild symbol shown on the expanding reel, as well as a second expanding reel showing a second expanded wild symbol.

FIG. 6B is similar to FIG. 6A but illustrates a playing field incorporating two expanding reels assigned to two central columns 615CA, 615CB. As with FIG. 6A, both expanding reels 630A, 630B are shown with an expanded wild symbol 625WA, 625WB occupying all positions 620 of the respective columns 615CA, 615CB. FIG. 6B is one example of a game having a playing field 605 incorporating multiple expanding reels 630A, 630B. Here, a first expanding reel 630A is assigned to, and a portion shown in, a first central column and a portion of a second expanding reel 630B is a second central column 615CB.

As with other embodiments, the pairs of columns to either side of the expanding reels generally are assigned the same reel or matching reels and are stopped at the same time, ensuring that the same symbols are shown in each column of a pair. Thus, each pair of columns always match one another. Although two pairs of matching columns are shown in FIG. 6B, more sets of matching columns may be used in order to expand a size of the playing field. Additionally, although both expanding reels are shown in their expanded state on their respective central columns 530, 630, there is no requirement that the expanding reels match one another. Conversely, some embodiments may assign the same reel or matching reels to both of the central columns.

Further, in some embodiments the columns to which expanding reels are assigned may be adjacent or may be separated from one another by columns to which non-expanding reels are assigned. For example, one, two, or more columns may separate the columns to which expanding reels are assigned. Such "separating columns" may be assigned different non-expanding reels or the same non-expanding reel (or reels).

Certain embodiments may incorporate or associate a multiplier with the expanding reel. In such embodiments, when a wild symbol appears in the playing field and expands to occupy all positions of its column, it not only acts as a match for adjacent symbols but also increases a payout for any matches on the playing field. The multiplier may be fixed or may vary with each spin or play of the game. For example, the multiplier may be determined by the processor executing a call to the RNG module of the gaming device or a server(s) networked to the gaming device. Generally, although not necessarily, lower multipliers have higher odds of being selected than higher multipliers. For example, a 2× multiplier may be four times more likely to be selected than a 3× multiplier and 10 times more likely to be selected than a 5× multiplier, although these are example values and not required values. Typically, a weight of each multiplier varies with a number of wild symbols on a reel; as the number and/or density of wild symbols increases, the likelihood of a lower multiplier being selected increases while a likelihood of selecting a higher multiplier decreases. By making lower-value multipliers more likely to be selected than higher-value multipliers, both RTP and volatility may be constrained. Similarly, embodiments using multiple expanding reels may have a greater likelihood (e.g., weight or percentage chance) of a lower multiplier being selected than a higher multiplier, since the use of multiple expanding reels increases a likelihood of generating a match on a playing field.

Some embodiments may have reel strips where each wild symbol is associated with a particular multiplier. The wild symbols may look the same but the multipliers may be different, or the wild symbols may look different from one another and/or incorporate information signifying the associated multiplier. In such embodiments, a first wild symbol may be associated with a first multiplier and a second wild symbol with a second multiplier; in this example, the first multiplier is less than the second multiplier. Accordingly, there are generally more instances of the first wild symbol than the second wild symbol on the expanding reel.

FIG. 7 shows a sample reel strip configuration for an expanding reel 700. In order to obtain a designated RTP and volatility, the reel strip 700 is configured such that the wild symbols 705 are grouped together, with picture symbols 710 immediately preceding and following the group of wild symbols. These picture symbols 710 are generally high-value symbols, meaning that they generate large payouts when matched with the same symbols showing in other columns of a playing field. Thus, if the expanding reel 700 stops in such a fashion that it shows a wild symbol, that wild symbol will expand to replace either other wild symbols or high-value symbols. This may reduce the RTP of the gaming device that results from the expansion of the wild symbol as compared to a reel strip that has low-value picture symbols or blank symbols on either side of the wild symbols, or that intersperses wild symbols throughout the strip.

Figure 8:
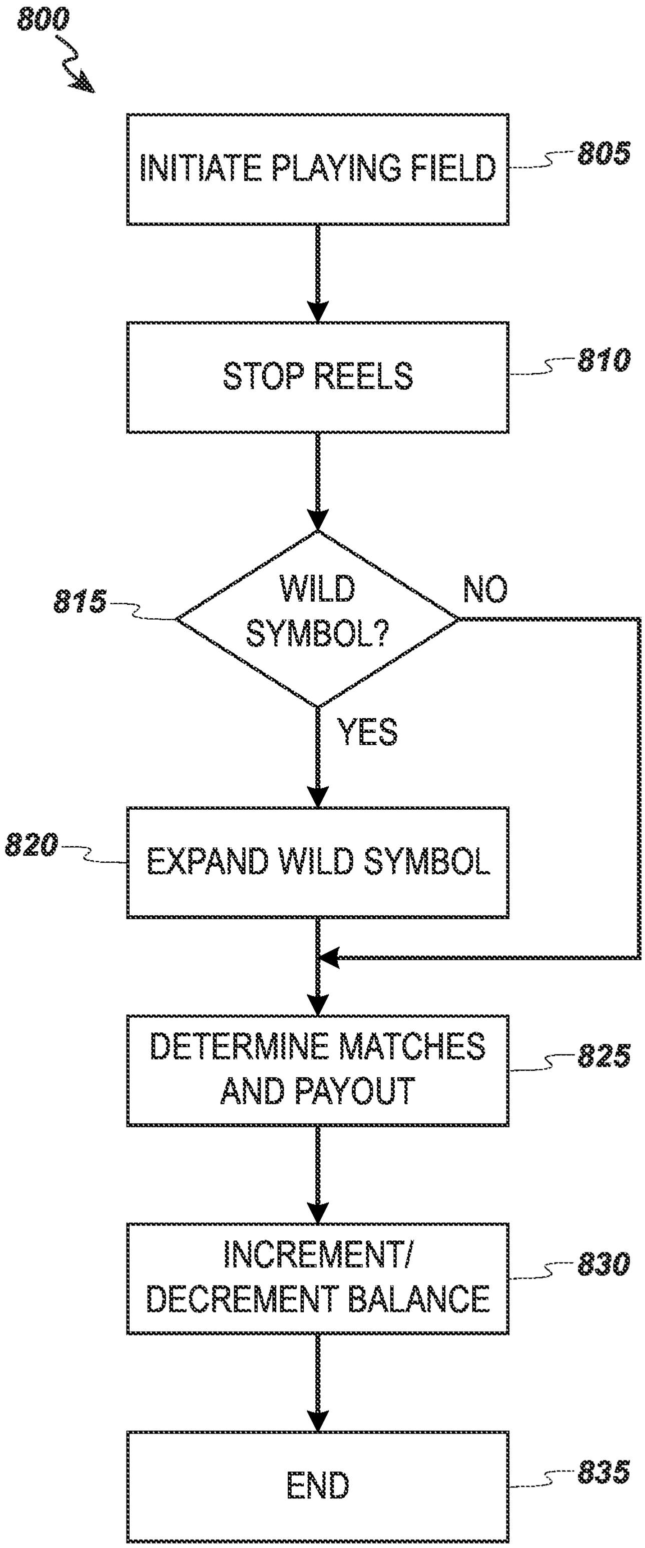
FIG. 8 is a flowchart showing one sample method for operating a slot type game incorporating an expanding reel.

FIG. 8 is a flowchart showing a sample method 800 for a gaming device to execute a slot-type game that utilizes an expanding reel. The method 800 shown in FIG. 8 is but one example method and or processes or procedures may be used, and operations may be added, removed, or changed in order with respect to this method 800, without departing from the scope of this disclosure.

The method 800 begins in operation 805, in which a player initiates virtual or physical spinning of the reels to establish the playing field. Generally, a processor of the gaming device may use a RNG (or a lookup table) to determine which symbols on each reel are shown in the positions of the playing field. In certain embodiments and as also discussed above, the playing field may be formed by a four by five matrix of rows and columns, with each column corresponding to a reel. The first and second columns may correspond to identical reels (or the same reel), and a single RNG call may determine what symbols are shown in the positions of the first and second columns. The same is true of the fourth and fifth columns. Thus, for any given row, in certain embodiments the symbol in the first column matches the symbol in the second column and the symbol in the fourth column matches the symbol in the fifth column. In any embodiment described herein, each reel may be selected from a set of reels and then assigned to the appropriate column. Further, each column or set of matching columns (e.g., first and second columns, fourth and fifth columns, and the like) may be chosen from the same set of reels while other columns or set of matching columns are chosen from other sets of reels. It should be noted that any reference in the description of FIG. 8 to a RNG may refer to the use of a lookup table, as well.

The third, or middle, column may be a unique expanding reel column that includes wild symbols, as discussed above with respect to FIGS. 4-7. The symbols shown in the third column (e.g., the expanding reel column) may be chosen from the expanding reel column through a separate RNG call by the processor of the gaming device. The expanding reel may be constructed such that high value symbols or wild symbols are positioned on one or both sides of a wild symbol. In some embodiments, the number of high-value or wild symbols on each side of a wild symbol may equal one less than a number of rows in the playing field (or, in embodiments assigning reel strips to rows, one less than a number of columns in the playing field). In embodiments utilizing multiple expanding reels, the expanding reels may be identical or different, and may be chosen from the same set of reels or a different set of reels.

In operation 810, the reels are stopped by the processor and the symbols shown in positions on the playing field, which is displayed on a display of the gaming device. In some embodiments the reels are stopped from left to right, such that the first reel stops first and the fifth reel stops last. In other embodiments, the first and second reels may stop simultaneously, as may the fourth and fifth reels.

In operation 815, the processor determines whether a wild symbol is shown in the playing field. Generally, the wild symbol is only present on the expanding reel and so can only appear on the corresponding column, although other embodiments may utilize wild symbols in other reels. If the wild symbol is present, then in operation 820 the processor expands the wild symbol to occupy all positions on the column, thereby replacing other symbols previously shown in that column and expanding a number of matches on the playing field. If no wild symbol is present, then the method proceeds to operation 825, which also follows operation 820.

In operation 825, the processor determines what symbols, if any, on the playing field shown on the display generate wins for the player and calculates a corresponding payout (e.g., a sum of all wins). As part of this operation, as part of the operation of determining if a wild symbol is shown (e.g., operation 815), or as a separate operation, the processor may determine a multiplier associated with the expanded wild symbol (if any) shown on the playing field, as described above. In many embodiments, operation 825 (and, optionally operation 830) may swap places with operation 810, such that all determinations are performed before a player is shown a result of a spin or, indeed, before the player is shown the reels spinning at all. This permits an outcome of a game to be determined before providing any information or display to a player.

In operation 830, the processor may increment a player's credit balance by the payout amount or, in some cases, decrement the player's credit balance. A credit balance may be decremented by an amount of a wager less any winnings, as one non-limiting example.

Finally, in operation 835, the method 800 ends.

Any or all of the operations in the method 800 of FIG. 8 may be executed by a local processor of the gaming device or by one or more processors of one or more servers connected to the gaming device, or any combination of operations may be executed by any combination of local/server processors. For example, a processor of a server may execute all operations of the method 300 or may execute operations 805-830 while a local processor (or other processor, for example associated with a player tracking device) executes operation 830. This is but one non-limiting example.

Although embodiments have been discussed herein with respect to particular configurations and operations, variations may be made without departing from the sprit or scope of the disclosure. For example, some gaming devices may use multiple expanding reels. In such embodiments, the expanding reels may be next to one another or may be separated by non-expanding reels. Additionally, each of the expanding reels may have different orders of symbols and/or numbers of wild symbols; this permits the RTP and volatility of the game to be controlled and kept within desired parameters.

As yet another option, the expanding reel may have more positions in its column than the other reels. The expanding reel may for example, be used for a column having five or six positions rather than the four positions of the non-expanding reels. The use of a larger column (or row, in some embodiments) for an expanding reel may increase RTP in an embodiment that utilizes a pay line with diagonal elements. Such embodiments may increase RTP not only when an expanding reel is used but also when a reel having many or dense wild symbols, as compared to a non-expanding reel, is used.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming device, comprising:

a housing;

a processor within the housing and operative to:

determine, using a random number generator:

a first set of symbols chosen from a first reel strip;

a second set of symbols chosen from an expanding reel strip; and a third set of symbols chosen from a third reel strip;

control a display to display:

the first set of symbols in a first column and a second column of a playing field;

the second set of symbols in a third column of the playing field; and the third set of symbols in a fourth and a fifth column of the playing field, the third column being positioned between either the first and the second column or the fourth and the fifth column;

determine if any of the second set of symbols is a special symbol; and in the event any of the second set of symbols is the special symbol:

replace all symbols displayed in the third column with an expanded special symbol;

temporarily insert a sixth column into the playing field; and control the display to display the expanded special symbol in the sixth column.

2. The gaming device of claim 1, wherein the special symbol is a wild symbol.

3. The gaming device of claim 1, wherein a total number of positions in the third column is greater than a total number of positions in at least one other column.

4. The gaming device of claim 1, wherein:

the first and the second columns are to a left of the third column; or the fourth and the fifth columns are to a right of the third column.

5. The gaming device of claim 1, wherein the gaming device uses a payline with diagonal elements.

6. The gaming device of claim 1, wherein:

the processor is further operative to determine, using the random number generator, a fourth set of symbols chosen from an additional expanding reel strip; and the processor is further operative to control the display to display the fourth set of symbols in the sixth column of the playing field.

7. The gaming device of claim 1, wherein the sixth column is adjacent to the third column.

8. The gaming device of claim 1, wherein the expanded special symbol expands from the special symbol through an animation, thereby replacing all symbols displayed in the third column and in the sixth column.

9. The gaming device of claim 1, wherein the display is a component of the gaming device.

10. The gaming device of claim 1, wherein the display is a component of an electronic device that communicates with the gaming device.

11. A method for operating a slot type game, comprising:

determining, by a processor using a random number generator:

a first set of symbols chosen from a first non-expanding reel strip;

a second set of symbols chosen from an expanding reel strip; and a third set of symbols chosen from a second non-expanding reel strip;

displaying, on a display of an electronic gaming device:

the first set of symbols in a first column and a second column of a playing field;

the second set of symbols in a third column of the playing field;

the third set of symbols in a fourth column and a fifth column of the playing field, the third column being positioned between either the first and the second column or the fourth and the fifth column;

determining, by the processor, whether any of the second set of symbols is a special symbol; and in the event the processor determines that any of the second set of symbols is the special symbol:

expanding a wild symbol to occupy all positions of the third column;

temporarily inserting a sixth column into the playing field; and controlling the display to display the expanded special symbol in the sixth column.

12. The method of claim 11, wherein the symbols shown in the first column and the second column are identical.

13. The method of claim 11, wherein the expanding reel strip is selected from a group of expanding reel strips.

14. The method of claim 11, wherein only the expanding reel strip includes the wild symbol.

15. The method of claim 11, wherein the sixth column is adjacent to the third column.

16. The method of claim 11, wherein the special symbol is a multiplier.

17. The method of claim 11, wherein, when the wild symbol expands to occupy all positions of the third column, it displaces at least one picture symbol.

18. A non-transitory computer-readable medium containing instructions which, when executed by one or more processors of one or more servers, cause the one or more processors to:

initiate a playing field on a gaming device, by using a random number generator to assign a set of reels to the playing field;

randomly determine, using the random number generator, when the set of reels is to be stopped, thereby determining a set of symbols to be shown on the playing field;

determine whether a wild symbol is shown on the playing field;

in the event the wild symbol is shown on the playing field, replacing at least one symbol in a column containing the wild symbol with an expanded wild symbol;

wherein:

the playing field is formed from multiple columns including a first pair of columns, a second pair of columns, and the column;

the column is positioned between either the first pair of columns or the second pair of columns;

a temporary column is inserted into the playing field; and at least one symbol in the temporary column is replaced with the expanded wild symbol.

19. The non-transitory computer-readable medium of claim 18, wherein the temporary column is adjacent to the column.

20. The non-transitory computer-readable medium of claim 18, wherein each wild symbol of the column is surrounded by symbols that have higher values than other symbols on the first pair of columns.

* * * * *